United States Patent [19]

Parker

[11] Patent Number: 5,372,379
[45] Date of Patent: Dec. 13, 1994

[54] PREHEATED SAFETY AIR BAG COVER
[75] Inventor: Thomas G. Parker, Strafford, N.H.
[73] Assignee: Davidson Textron Inc., Dover, N.H.
[21] Appl. No.: 196,553
[22] Filed: Feb. 15, 1994
[51] Int. Cl.⁵ .............................................. B60R 21/20
[52] U.S. Cl. ................... 280/728 B; 280/732; 165/41; 219/202
[58] Field of Search ...................... 280/728 B, 732, 731, 280/734, 735, 736, 752, 728 A; 165/41; 219/202

[56] References Cited
U.S. PATENT DOCUMENTS

| | | | |
|---|---|---|---|
| 3,980,318 | 9/1976 | Balban | 280/735 |
| 4,026,580 | 5/1977 | Wulf et al. | 280/736 |
| 4,387,290 | 6/1983 | Yasuda | 165/41 |
| 4,963,716 | 10/1990 | Van Den Elst et al. | 219/202 |
| 5,072,967 | 12/1991 | Batchelder et al. | 280/732 |
| 5,080,393 | 1/1992 | Dixon, Jr. et al. | 280/732 |
| 5,154,444 | 10/1992 | Nelson | 280/732 |
| 5,217,244 | 6/1993 | Bauer | 280/728 B |
| 5,256,354 | 10/1993 | Chadwick | 280/732 |
| 5,257,818 | 11/1993 | Steffens, Jr. | 280/736 |

Primary Examiner—Eric D. Culbreth
Assistant Examiner—Peter C. English
Attorney, Agent, or Firm—Reising, Ethington, Barnard, Perry & Milton

[57] ABSTRACT

A cover normally concealing a safety air bag is adapted to rupture to form an opening for air bag deployment into the passenger compartment of a motor vehicle. The cover is formed of plastic material that tends to become embrittled and fragment when torn or pierced below a certain ambient temperature. A heater is provided behind the cover that is adapted to heat the rupture area in the event of air bag deployment. A heater control operates the heater to maintain this critical area above the fragmentation temperature when the vehicle is being operated at low ambient temperatures that would cause plastic embrittlement.

8 Claims, 3 Drawing Sheets

PREHEATED SAFETY AIR BAG COVER

FIELD OF THE INVENTION

This invention relates to motor vehicle safety air bag covers and more particularly to those that will fragment on rupturing to form an opening for air bag deployment below a certain ambient temperature.

BACKGROUND OF THE INVENTION

In the course of concealing the presence of safety air bags in a motor vehicles there has evolved a cover made of plastic material that normally conceals the air bag and has a hidden or invisible tear seam that is torn or ruptured by the stress of air bag inflation to form an opening for deployment of the air bag into the passenger compartment. There are also cover assemblies wherein the cover is ruptured by piercing devices to form an opening therethrough for air bag deployment. Examples of such air bag concealing cover devices are disclosed in U.S. Pat. Nos. 5,072,967; 5,154,444 and 5,256,354 assigned to the assignee of this invention. While these concealing cover devices have proven generally satisfactory, most plastic materials tend to become embrittled at very low ambient temperatures. As a results such covers might fragment along the edges of the opening in the cover produced by the rupture when the air bag is required to deploy at extremely cold temperatures such as −20 degrees Fahrenheit and below. Consequently, there is only a limited number of materials suitable for this use.

It is known to incorporate various heater devices in association with an air bag concealing cover arrangement. But they have been for the purpose of producing (burning) the opening through the plastic cover for air bag deployment at the time of impact and are not suited to assuring against fragmentation of the plastic material at that instant let alone in an energy efficient manner. Examples of such heater devices are disclosed in U.S. Pat. Nos. 5,080,393 and 5,217,244.

SUMMARY OF THE INVENTION

The present invention is applied to a safety air bag cover for a motor vehicle having an air bag that is concealed by a plastic cover that is adapted to rupture (tear or be pierced) in a prescribed area in forming an opening for air bag deployment. The plastic cover has a vinyl skin or shell and foam backing that tends to become embrittled and fragment when subjected to tearing or piercing below a certain temperature. To remedy this problem, a heater is provided behind the cover that is strategically located and controlled to heat the critical surrounding area that would define the opening so that it remains soft and pliable during vehicle operation when the ambient temperature is so low that it would otherwise cause embrittlement of this critical area. Thus, the possibility of fragments from the cover entering the passenger compartment during air bag deployment is eliminated.

The heater may take various forms such as a series of small electrical heater elements or an electrical heater strip applied along the critical area or it may be a small forced air heater directed toward this area. The control for the heater comprises an electrical circuit connected with the vehicle's ignition circuit and includes a thermostat for activating the heater whenever the ambient temperature falls below a specified temperature tending to produce plastic embrittlement. Thus, the critical area is only heated when required to conserve electrical energy. Moreover, the heater capacity is determined so that the critical cover area is brought up to this temperature in a very short time; i.e. a time less than that required to put the vehicle in operation and into a possibly serious impact situation.

It is therefore an object of the present invention to provide a new and improved motor vehicle safety air bag cover made of plastic that is preheated so as to remain soft and pliable at low ambient temperatures in preparation for rupturing to form an opening for air bag deployment.

Another object is to provide a motor vehicle safety air bag cover made of plastic that is preheated during vehicle operation at low ambient temperatures so as to be prepared to rupture but not fragment in forming an opening for air bag deployment at these low ambient temperatures.

Another object is to provide a motor vehicle safety air bag cover made of plastic with a heater that is directed and controlled to preheat a certain area of the cover during vehicle operation at low ambient temperatures so as to be prepared to be torn or pierced but not fragment in forming an opening for air bag deployment at these low ambient temperatures.

Another object is to quickly establish and maintain a motor vehicle safety air bag cover made of plastic at a temperature above its embrittlement temperature whenever the vehicle is being operated so that the cover is prepared to be ruptured to provide an opening therethrough for air bag deployment at low ambient temperatures that would otherwise cause embrittlement of the plastic cover in its opening forming area.

These and other objects, advantages and features of the present invention will become more apparent from the following description of the preferred embodiments with reference to the accompanying drawings wherein:

DETAILED DESCRIPTION OF THE DRAWINGS

Figure 1:
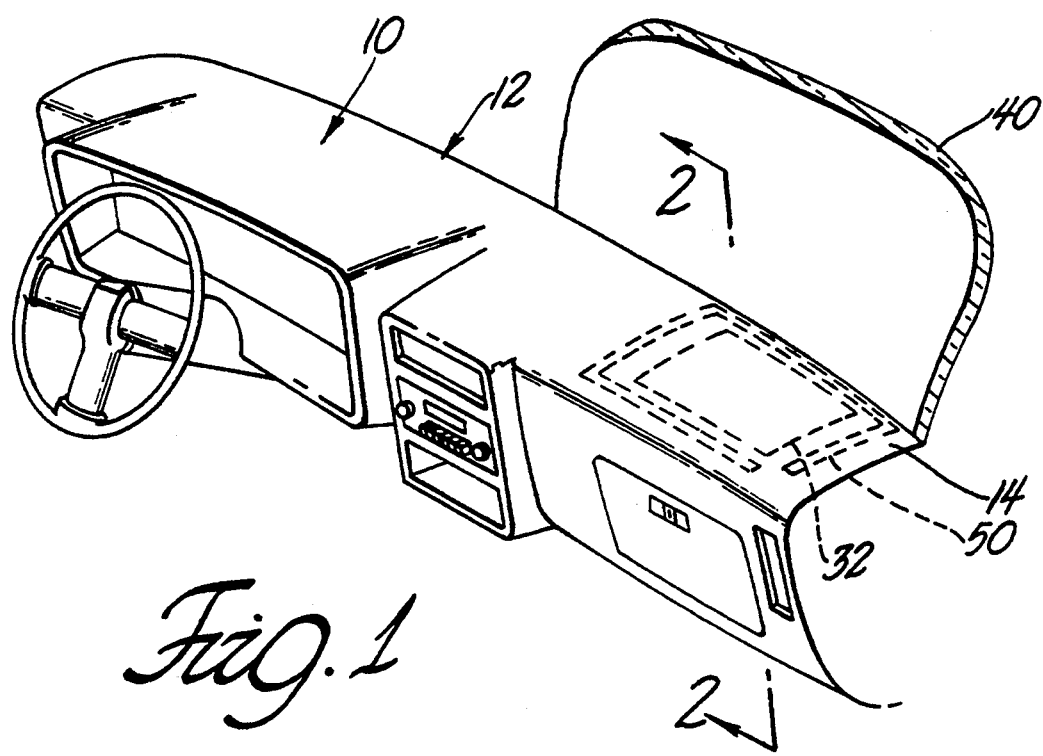
FIG. 1 is a perspective view of a motor vehicle instrument panel having a cover that conceals an inflatable safety air bag and has a heater system associated therewith in accordance with the present invention.
Figure 2:
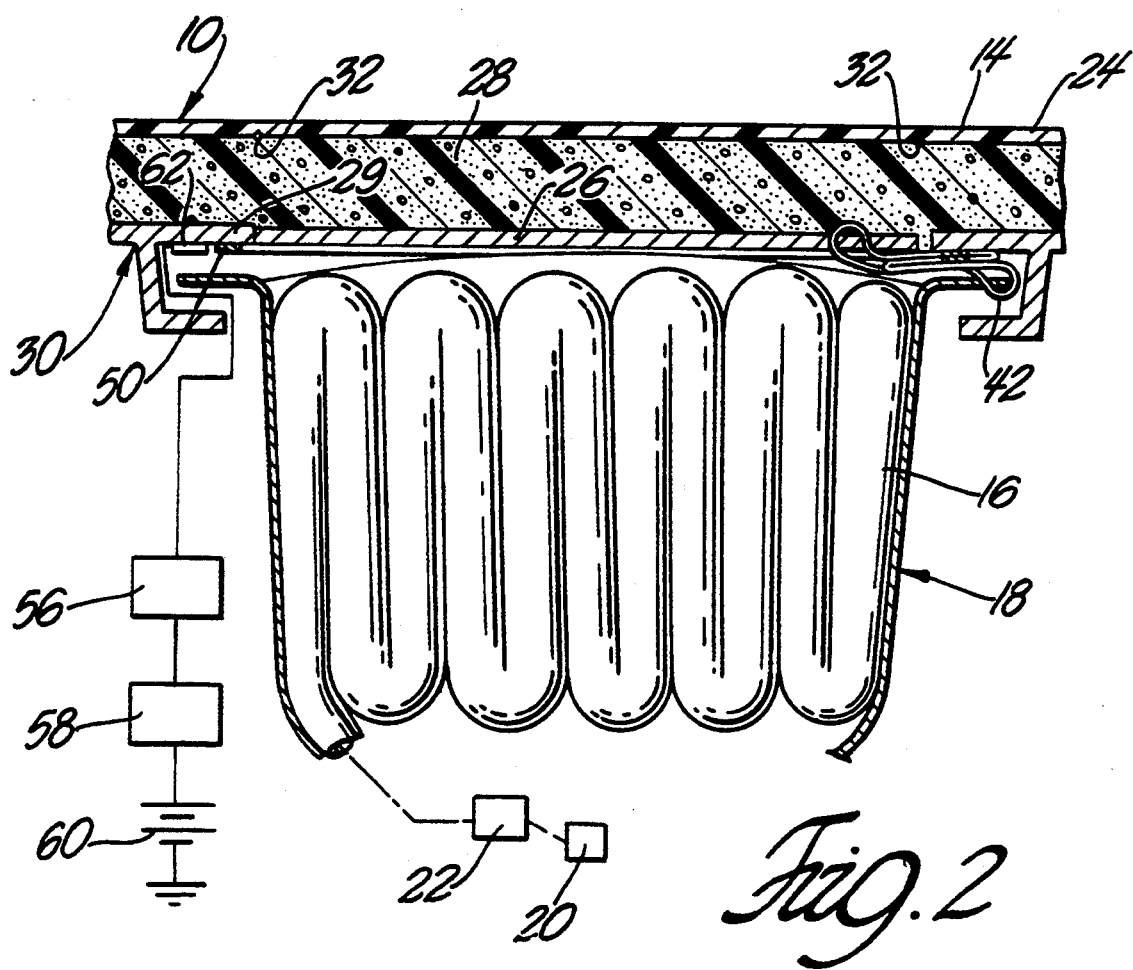
FIG. 2 is an enlarged sectional view taken along the line 2—2 in FIG. 1 when looking in the direction of the arrows.

Referring to FIGS. 1 and 2, there is illustrated an instrument panel 10 in the passenger compartment of a motor vehicle generally designated as 12. The instrument panel 10 includes a cover 14 that on the passenger side conceals an inflatable air bag 16 of an air bag restraint system 18. The restraint system has the normal impact sensor 20 that triggers a gas generator 22 to inflate the air bag on vehicle impact of a certain magnitude.

The cover 14 has an outer skin or shell 24, a separable insert 26 of rectangular shape on the backside opposite the air bag 16 and urethane foam 28 filling the space between the skin and the insert and an adjoining coextensive section 29 of a retainer 30 that provides for securing the instrument panel to the frame of the vehicle. The skin 24 is made of thermoplastic material such as polyvinyl chloride resin material (PVC) and is formed to have a hidden tear seam or groove 32 formed on the inner side thereof. The insert 26 is of a lighter weight material such as aluminum and is insert molded in place with the foam 28 together with the surrounding retainer 30 in a mold having the skin 24.

Figure 3:
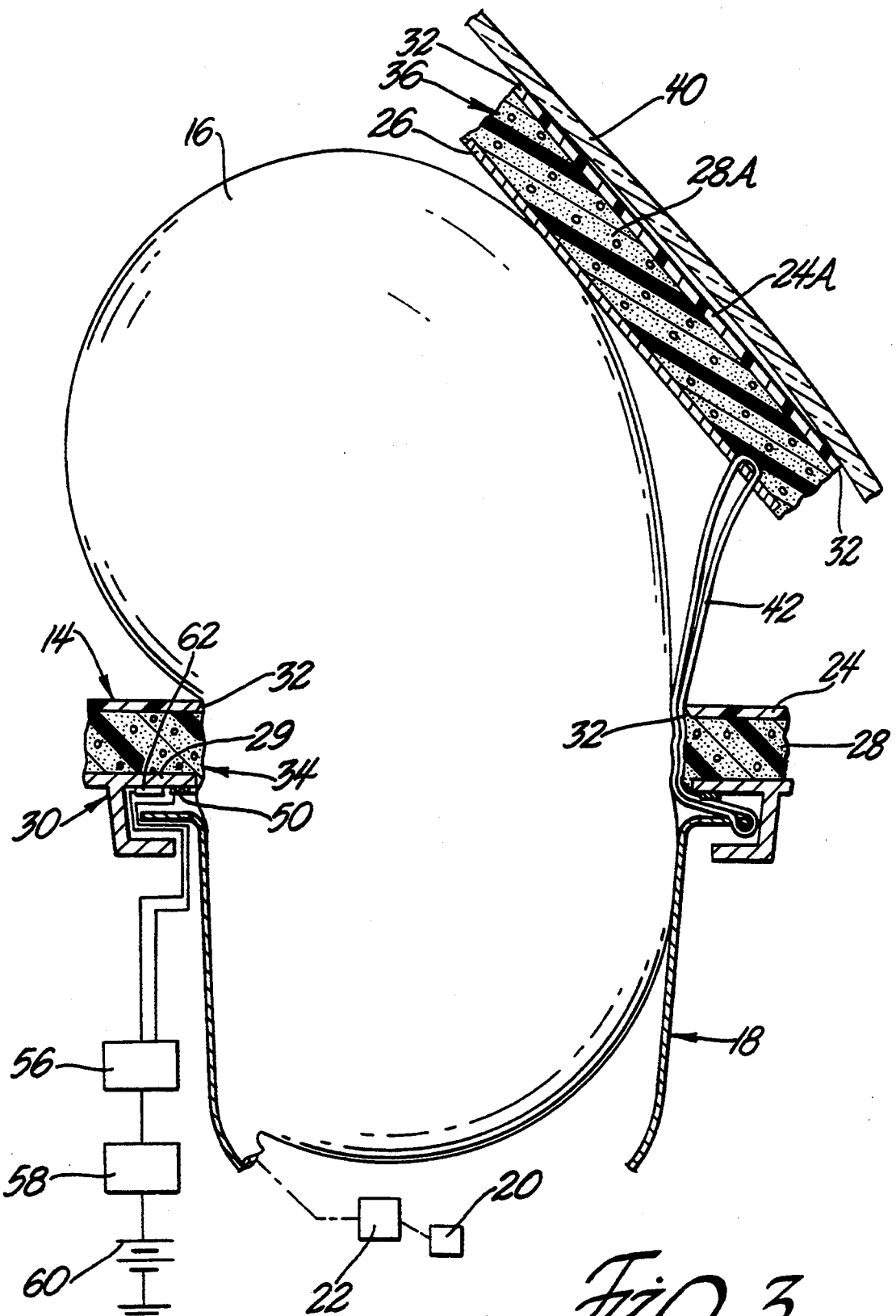
FIG. 3 is a view like FIG. 2 but showing the cover torn open and the air bag deployed.

As illustrated in FIG. 3, the hidden tear seam 32 in the vinyl skin 24 together with the foam 28 along the line of this seam is torn by the stress of inflation of the air bag upon vehicle impact and forms an opening 34 through the cover for deploying the air bag into the passenger compartment. In tearing, the cover 14 separates along the seam 32 into a door 36 comprising a skin section 24A, foam section 28A and the insert 26. The door 36 is directed upwardly and outwardly of the instrument panel by the inflating air bag and impacts against the windshield 40 of the vehicle which will absorb the energy. A tether 42 connects the insert 26 to the retainer 30 to prevent the air bag deployment door 36 from entering the passenger zone. The structure thus far described is like that disclosed in the above identified U.S. Pat. No. 5,072,967 which is hereby incorporated by reference and to which reference may be made for details beyond those described here.

Figure 4:
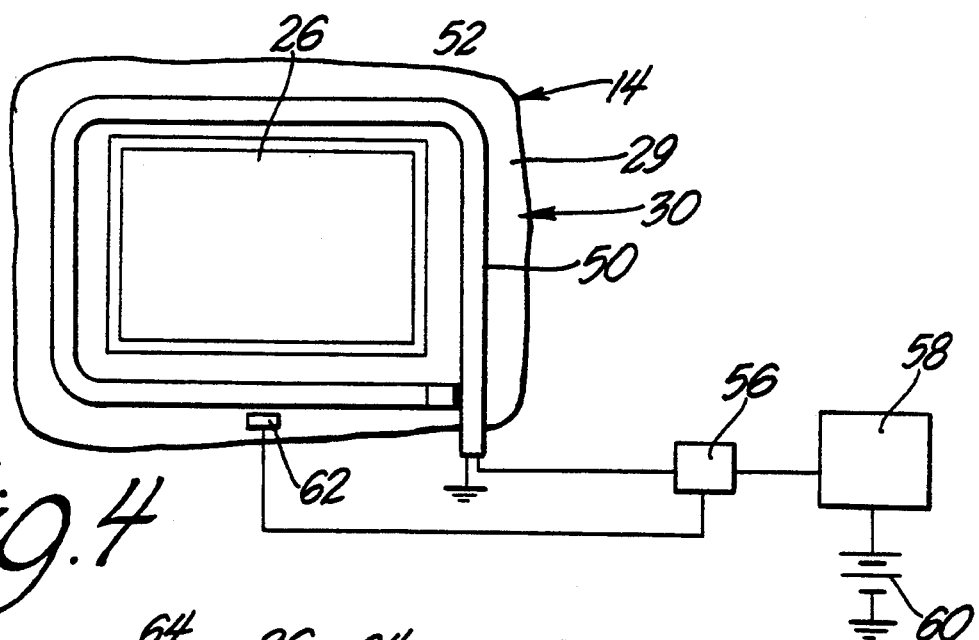
FIG. 4 is a reduced view taken along the line 4—4 in FIG. 2 when looking in the direction of the arrows.

In accordance with the present invention and with reference to FIGS. 1, 2 and 4, an electrical heater strip 50 like that used in motor vehicle window defoggers is applied by an adhesive to the instrument panel retainer section 29 along and adjacent to the edge 52 of the insert 26 and thus in close proximity to the area of the cover 14 traced by the tear seam 32 that is ruptured in forming the opening 34. The heater strip 50 is connected through a thermostat 56 with the vehicle's ignition system 58 to receive power from the vehicle's storage battery 60 only during vehicle operation. Power is thus available to the heater strip 50 immediately on vehicle operation but is not delivered thereto until needed by the control of the thermostat 56 in order to conserve energy.

The thermostat 56 has a sensor 62 mounted with an adhesive on the retainer section 29 adjacent the heater strip 50 and is set to close at a temperature such as 30 degrees Fahrenheit that will assure that a substantial area of the foam 28 and skin 24 in proximity to the tear seam 32 remains soft and pliable when the ambient temperature falls below this temperature. Moreover, the heater circuit is provided with enough capacity to quickly heat up this critical area to the regulated temperature so that it is ready for air bag deployment soon after vehicle operation start up. For example, a time of 30 seconds or slightly less is a reasonable time frame. Thus at low ambient temperatures that would embrittle the covers the area of the vinyl skin 24 and foam 28 in proximity to the tear seam is heated (preheated) during vehicle operation so as to prevent fragmentation in the tearing of the cover to establish the air bag deployment opening in the event of a vehicle impact at these low temperatures.

Figure 5:
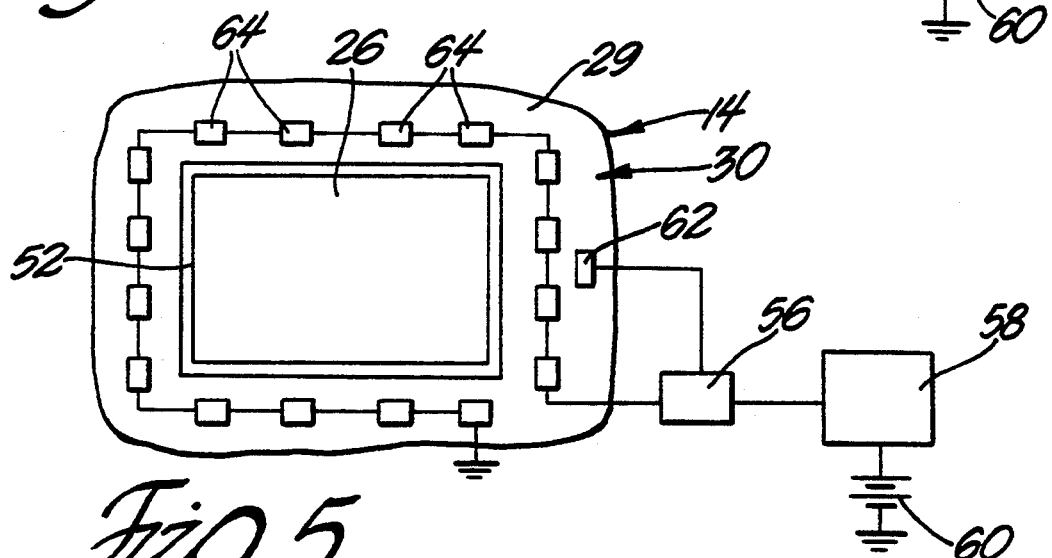
FIG. 5 is a view similar to FIG. 4 but showing another embodiment of the heater according to the present invention.

In place of the heater strip, the potential rupture area of the cover can also be preheated at low ambient temperatures by a series of small electrical heater elements 64 as illustrated in FIG. 5. The heater elements 64 are adhesively secured to the outer or backside of the retainer section 29 and are spaced about the insert 26 paralleling the tear seam 32. As illustrated in FIG. 5, the heater elements are connected in a circuit like the heater strip to heat the potential rupture area of the cover as required and in an energy saving manner.

Figure 6:
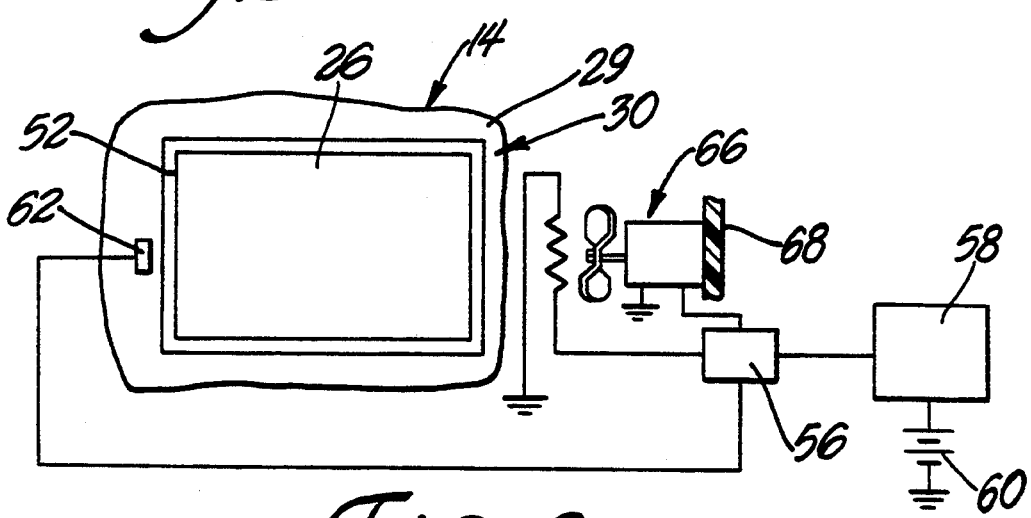
FIG. 6 is a view similar to FIG. 4 but showing another embodiment of the heater according to the present invention.

The area of the tear seam 32 and adjacent foam 28 may be preheated at low ambient temperatures to prevent fragmentation by other means such as a small forced air heater 66 as illustrated in FIG. 6. The forced air heater 66 is mounted on a rigid portion 68 of the instrument panel retainer 30 behind the cover 14 and is directed toward the critical area that includes the insert 26 and retainer section 29 covering foam 28 and tear seam 32. The forced air heater 66 is controlled with an electrical circuit as illustrated in FIG. 6 like that for the heater strip and heater elements described above.

The invention has been described in an illustrative manner with respect to various embodiments, and it is to be understood that the terminology that has been used is intended to be in the nature of words of description rather than of limitation. Obviously, many modifications and variations of the present invention in light of the above teachings may be made. For example, while the specific cover construction shown has a hidden tear seam in the skin and a separable insert for forming the opening and foam therebetween, the invention in preheating could also be applied to air bag covers of different construction where tearing or piercing of their plastic material is required to create an opening therethrough for air bag deployment. It is therefore to be understood that within the scope of the appended claims, the invention may be practiced otherwise than as specifically shown and described.

What is claimed is:

1. In combination, a motor vehicle having an operating system, a preheated safety air bag cover arrangement comprising an inflatable air bag, a cover normally covering said air bag in a concealed manner, said cover having a tear seam adapted to rupture so as to form an opening therethrough for air bag deployment, said cover being formed of a plastic material that tends to become embrittled and fragment along said tear seam when ruptured below a certain temperature, a tear seam heater in direct heat transfer relationship with said tear seam adapted to heat said tear seam, and a tear seam heater control including a temperature control operatively associated with said heater and said operating system and said tear seam adapted to operate said heater to maintain said tear seam above said certain temperature only when the vehicle is being operated to prevent said cover from fragmenting along said tear seam in the event said tear seam is ruptured for air bag deployment.

2. A combination as set forth in claim 1 wherein said operating system has an ignition system to which said tear seam heater control is connected for operation when the ignition system is activated.

3. A combination as set forth in claim 1 wherein said operating system has an ignition system and a storage battery, said tear seam heater control including a thermostat in heat transfer relationship with said tear seam adapted to sense the temperature of said tear seam and connected by said ignition system to said battery so as to operate whenever the ignition system is activated.

4. A combination as set forth in any of claims 1, 2 or 3 wherein said cover has a backside and said tear seam heater comprises an electrical heater strip mounted on said backside of said cover and extending about said tear seam.

5. A combination as set forth in any of claims 1, 2 or 3 wherein said cover has a backside and said tear seam heater comprises a series of electrical heater elements mounted on said backside of said cover and extending about said tear seam.

6. A combination as set forth in any of claims 1, 2 or 3 wherein said tear seam heater comprises an electrical forced air heater located behind said cover and directed toward said tear seam.

7. A combination as set forth in any of claims 1, 2 or 3 wherein said cover comprises a vinyl skin and said tear seam is on an inner side thereof hidden from view and is adapted to be torn along the length thereof by the stress of said air bag on inflation.

8. A combination as set forth in any of claims 1, 2 or 3 wherein said cover comprises a vinyl skin, a retainer including a separable insert corresponding in size to said opening and urethane foam sandwiched between said skin and said retainer including said insert, said tear seam formed on an inner side thereof hidden from view and adapted to be torn along the length thereof together with said foam by the stress of said air bag on inflation whereby a portion of said skin and said foam and said insert separate from said cover as a unit in forming said opening on air bag inflation.

* * * * *